April 9, 1957
L. HEIDMANN
MACHINE FOR SHAPING CONTAINERS
Filed Dec. 24, 1952
2,787,973
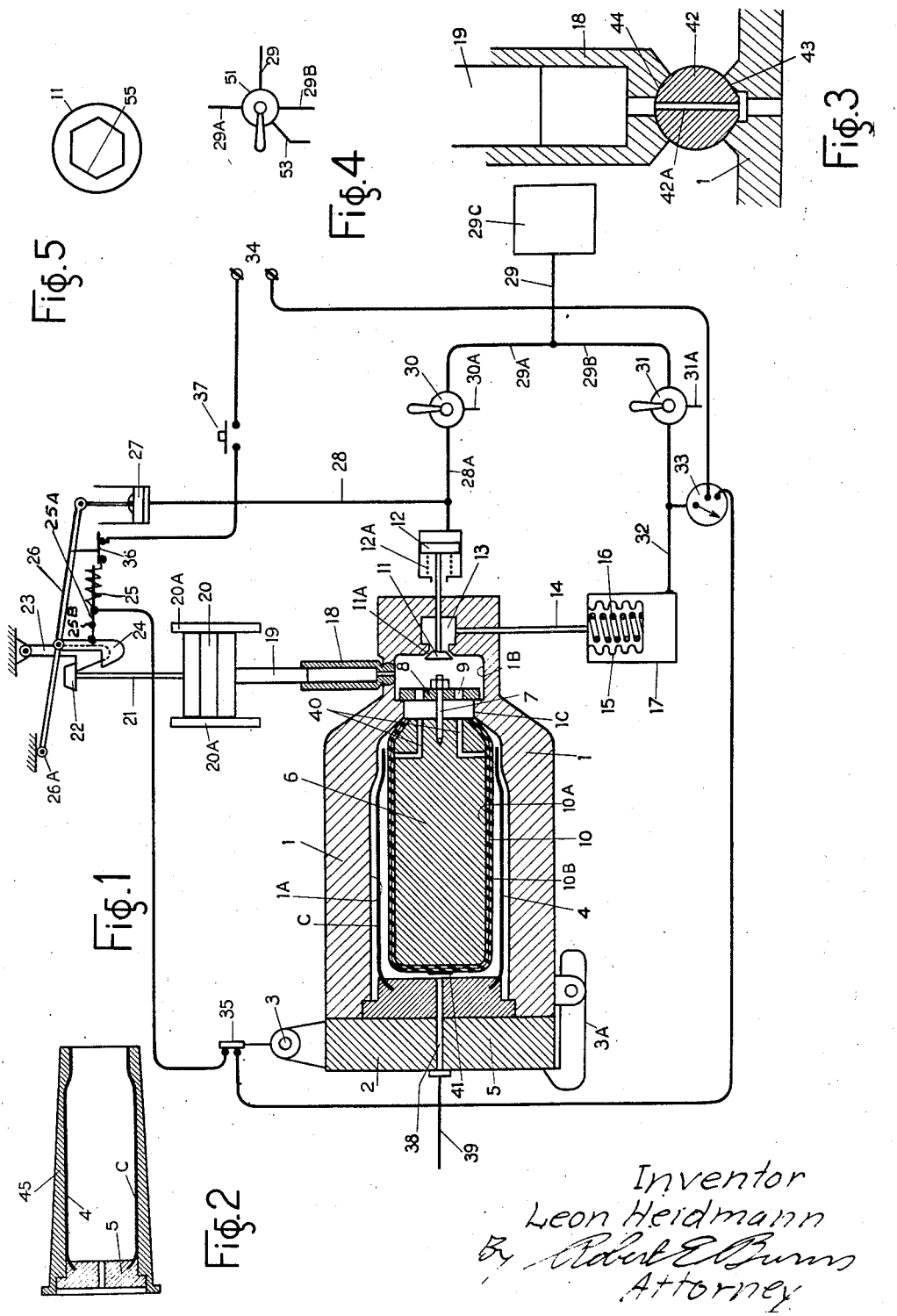
Inventor
Leon Heidmann
By Robert E. Burns
Attorney

United States Patent Office 2,787,973
Patented Apr. 9, 1957

2,787,973
MACHINE FOR SHAPING CONTAINERS
Leon Heidmann, Paris, France, assignor to Forges et Ateliers de Constructions Electriques de Jeumont, Paris, France, a corporation of France
Application December 24, 1952, Serial No. 327,756
Claims priority, application France June 10, 1952
6 Claims. (Cl. 113—44)

The present invention relates to a machine for shaping various containers by internal pressure and is particularly applicable to shaping containers of the kind forming the subject matter of application Serial No. 292,321 filed June 7, 1952.

It is an object of the invention to provide an automatic, or semi-automatic, hydraulic machine operating with a moderate initial pressure and a high working pressure to give the containers their final shape and structure. The invention makes it possible to achieve rapid and economical operation. It also provides for automatically insuring the correct sequence of operations and full safety of operation.

The objects and advantages of the invention will be more fully understood from the following description and claims in conjunction with the accompanying drawings, in which:

Fig. 1 is a simplified overall diagrammatic view of the machine, with certain elements shown in side elevation and others shown in longitudinal vertical section.

Fig. 2 is a detailed view showing in longitudinal section a container to be shaped and an intermediate jacket used to facilitate insertion and extraction of the container.

Fig. 3 is an enlarged detail of a portion of Fig. 1.

Fig. 4 is a diagrammatic view corresponding to a portion of Fig. 1 but showing an alternative control arrangement.

Fig. 5 is an end view of a check valve shown in Fig. 1.

In Fig. 1, there is illustrated a machine in accordance with the invention comprising a mold 1 having a mold cavity 1A adapted to receive a container to be shaped. The mold cavity is shown as being approximately cylindrical and may be more or less tapered, as desired. At one end, the mold cavity is closed by a head 2 which can be opened to insert and remove containers. For the sake of simplicity, the head 2 is shown as being pivoted about an axis 3 and releasably held in closed position by a latch 3A but it will be understood that other arrangements may be used.

A container C that is to be shaped by the machine in accordance with the invention comprises an approximately cylindrical side wall portion 4 and an end or bottom 5. The side wall portion 4 is suitably attached to the bottom 5, for example by having a circular end edge portion of the side wall clamped in a circular groove formed in the bottom wall.

At the end opposite the head 2, the mold 1 has an extended portion in which there is provided a chamber 1B that communicates with, and is approximately coaxial with, the mold cavity 1A but is separated from the mold cavity by an annular neck or shoulder 1C of smaller diameter than the mold cavity and the chamber 1B. An approximately cylindrical core 6 projects into the mold cavity 1A and is of a size and shape substantially filling a container C disposed in the cavity. The core is held in place by a bolt 7 which goes through a disc 8 anchored in the compartment 1B and having perforations 9. The core 6 is enclosed by a fluid-tight sack or envelope 10 of elastic material, such as rubber, the edges of this envelope being gripped between a conical part of the core 6 and the shoulder 1C of the mold to provide a fluid-tight joint capable of withstanding high pressure. Preferably, the elastic envelope 10 is made up of two superposed sacks of which the inner one 10A insures tightness while the outer sack 10B constitutes a protective envelope or casing which can be easily replaced.

The chamber 1B opens into a cavity 13 through an opening 11A which forms a seat for a check valve 11. An auxiliary piston and cylinder 12 is provided for opening the check valve 11, as described below, while a spring 12A tends to move the check valve 11 toward closed position. The cavity 13 is connected by a pipe 14 to the inside of an elastic bellows 15 which encloses a compression spring 16 and is mounted inside a fluid-tight container 17. The container 17, together with the bellows, constitutes a pressure exchanger whereby fluid pressure can be transmitted through the bellows without mixing the fluids inside and outside the bellows. It should be noted that the bellows 15 can be replaced by a differential piston or other device for transmitting pressure.

Above the portion of the mold containing the chamber 1B, there is shown a cylinder 18 the lower end of which communicates with the chamber 1B. A plunger piston 19 having a small diameter corresponding to the diameter of the cylinder is reciprocable in the cylinder and carries a heavy weight 20 above which there projects a rod 21 having a head portion 22. The weight 20 is movable in a substantially vertical direction, being guided in its movement by guides 20A. At its lower end, the cylinder 18 has a swivel joint that permits perfect alignment of the plunger piston 19 with the cylinder despite the relatively imperfect guiding of the weight 20.

The swivel joint is shown diagrammatically on a larger scale in Fig. 3. The high pressure cylinder 18 has a concave surface 44 which rests on a steel ball 42 having a vertical hole 42A. The steel ball 42 in turn rests on a conical surface 43 of the mold 1. The areas of the surfaces 43 and 44 are smaller than the cross section of the piston 19 so that the ball 42 presses on its seats with a force proportional to the pressure of the fluid. This assures perfect fluid-tightness without any packing while permitting the cylinder to swing laterally in order to become correctly aligned with the piston 19.

The weight 20 and plunger 19 are shown in an upper position in which they are held by a releasable catch 23. Release of the catch 23 permits the rapid descent of the weight 20. In the embodiment shown in the drawing by way of example, there is a second retaining and arming catch 24 disposed below the catch 23. The two catches are pivotally mounted so as to be swung toward the right, as viewed in Fig. 1, to release the weight 20. Means is provided for swinging the catches to release position, such means being illustrated in the drawings as a solenoid 25 comprising an armature 25A and a mechanical linkage 25B. It will be understood that, instead of acting directly on the two catches, as shown in the simplified drawing, this solenoid can form part of an electrically operated valve which controls one or more servomotors of the pneumatic, hydraulic, or other type, to actuate the catches.

The catch 24 is shown pivotally mounted on an arming lever 26 that is pivotally mounted on a suitable support at 26A and can be raised by an arming piston 27 actuated pneumatically or hydraulically. Pressure fluid for operating the piston 27 is supplied through lines 28, 28A, 29A and 29 from a pressure tank 29C under control of a normally closed valve 30 having a discharge 30A. The line 28A is also connected with the cylinder of the piston 12 for opening the check valve 11, the flow of fluid to this cylinder being likewise controlled by the valve 30. The pressure tank 29C is connected by lines 29, 29B and 32 with the container 17 of the pressure exchanger, flow of fluid to the pressure exchanger being controlled by a valve 31 having a discharge 31A. The fluid pressure system supplied by the pressure tank 29C operates at relatively moderate pressure which is maintained by connections to a suitable pressure line or pump, not shown.

The solenoid 25 for releasing the weight 20 is controlled by a safety circuit comprising a source of electricity 34, a pressure-responsive switch 33 connected to the hydraulic line 32, a switch 35 which is closed when the head 2 of the mold 1 is closed and a switch 36 which is closed when the arming lever 26 and catch 24 are in their lower positions, as shown. There is also preferably a manually-controlled push-button or switch 37. All of the above mentioned switches are connected in series with the coil of the solenoid 25 for releasing the catches 23 and 24, so that the catches can be released only when all of the switches are closed.

The chamber 1B of the mold communicates with the interior of the envelope 10 through holes 9 in the anchored disc 8 and suitable passageways 40 provided in the core 6, so that fluid pressure supplied to the chamber 1B is transmitted to the inside of the envelope.

It should be noted that, while the pressure tank 29C supplies fluid under relatively moderate pressure, herein referred to as preparatory pressure, the plunger 19 and the weight 20 are dimensioned so as to create a very much higher operating pressure.

The operation of the machine illustrated in Fig. 1 is as follows. Both valves 30 and 31 being in their closed positions and their discharges 30A and 31A being open, a container C is introduced into the mold cavity 1A of the mold 1 and the head 2 is closed, thereby closing the switch contacts 35 of the safety circuit. The valve 31 is opened for a short time to supply fluid pressure from the supply tank 29C to the pressure exchanger 17. The bellows 15 is thereby compressed against the action of the spring 16. The bellows 15, cavity 13 and chamber 1B are filled with a suitable liquid, such as glycerin. Compression of the bellows 15 opens the check valve 11 against the closing spring 12A and forces liquid through the openings 9 and passages 40 to inflate and expand the elastic envelope 10 which is thereby closely applied to the internal surfaces of the container C that is to be shaped. Air enclosed initially between the sack 10 and the walls of the container is expelled through a hole 38 extending through the bottom 5 of the container and the head 2 of the mold. A plate 41 on the end of the envelope 10 overlies the hole 38 and prevents the rubber of the envelope from penetrating into the passage 38 under the high pressure subsequently applied. The distance between the plate 41 and the bottom 5 of the container is such that the orifice 38 is not closed until after all of the enclosed air has been evacuated.

During the foregoing preparatory inflating operation, the pressure measured by the pressure switch on a manometer 33 increases, so that, when the envelope 10 is completely inflated, the contacts o fthe switch are closed. When flow of liquid into the chamber 1B and the envelope ceases, the valve 31 is reclosed by the operator and the valve 11 closes under the action of its spring 12A, the pressure on the right side of piston 12 being relieved by the discharge 30A of the closed valve 30.

With the lever 26 and arming catch 24 in the position shown in Fig. 1, so as to close the contacts 36, and with the contacts 35 closed by the closing of the head 2 and contact 33 closed by the pressure in the line 32 connected to the envelope, the machine is prepared for applying final operating pressure to the container. This is effected by closing the push-button switch 37 momentarily to energize the solenoid 25 and thereby momentarily swinging the catches 23 and 24 toward the right, as viewed in Fig. 1, to release the weight 20. When the weight is thus freed, it descends rapidly and the plunger piston 19 is driven downwardly in the cylinder 18 to create a very high operating pressure that is transmitted through the chamber 1B and passages 40 to the interior of the envelope 10. The walls 4 of the container are thereby pressed against the mold with a very great force so as to give these walls their definite shape and structure. During this application of very high pressure to the envelope, the check valve 11 is closed so that the high pressure cannot be transmitted back to the moderate pressure supply system by means of which the envelope 10 was initially inflated, as described above.

Following their rapid descent, the weight 20 and plunger 19 rebound elastically. This rebound is apparently attributable to the inherent elasticity of the high pressure hydraulic system including the elasticity and resilience of the mold 1 and other confining walls. The rebound of the weight 20 and plunger 19 causes the head 22 to rise above the holding catch 24, whereupon it is caught by this catch. A large part of the energy resulting from the rapid descent of the weight is thereby recovered. After the head 22 of the weight-supporting rod 21 has hooked onto the catch 24, the valve 30 is opened for a short time. This has two results. In the first place, the line 28 supplies fluid pressure to the arming piston 27 which causes the lever 26 to rise, thereby lifting the catch 24 and the weight 20 into the upper position shown in the drawing. In this position, the weight 20 is held by the releasing catch 23. In the second place, the opening of the valve 30 supplies fluid pressure to the cylinder of the piston 12, causing the piston to move to the left against the action of spring 12A, to open the check valve 11. This permits the elastic envelope 10 to contract, expelling its filling fluid through the passages 40 and 14 into the bellows 15 which is thereby expanded. The fluid in the container 17 is evacuated through the discharge line 31A of the valve 31 which is in closed position. The evacuation of the envelope 10 is facilitated by the action of spring 16 and the bellows 15 which thereby sucks in the filling liquid. It can be further accelerated by injecting compressed air or other fluid through a line 39 connected with the passage 38 through the head 2 of the mold and the bottom 5 of the container.

The emptying of the envelope 10 and the raising of the arming lever 26 are preferably timed so that these two operations are completed approximately at the same time. The valve 30 is then re-closed, permitting fluid from the cylinders of pistons 12 and 27 to escape through the discharge line 30A. These pistons are thus returned to the positions shown in Fig. 1. The valve 11 is reclosed by the spring 12A and the lever 26 drops to its lower position, thereby re-closing the control contacts 36. The head 2 is then immediately opened to take out the shaped container C and replace it by another container to be shaped, after which the working cycle is repeated.

It is thus seen that the hydraulic control of the machine consists essentially in first opening the valve 31 until the closure of the pressure-responsive contacts 33, then reclosing the valve 31, operating the push-button switch 37, opening the valve 30 for emptying the envelope 10 and for raising the weight 20, and finally re-closing the valve 30.

In order to simplify Fig. 1, there has been omitted an element which plays an important role in facilitating and accelerating the extraction of the finished container from the mold 1. This element is shown separately in longitudinal section in Fig. 2. Instead of introducing the container C directly into the mold 1, it is inserted first into an intermediate jacket 45 of suitable metal. The external surface of this jacket has a slight taper or conicity (exaggerated in the drawings) and a diameter such that when the jacket is placed in the mold 1, there remains a very slight play between the jacket 45 and the mold 1. During the shaping operation described above, this play is taken up but after the operation it reappears and makes it possible to withdraw the jacket and enclosed container easily and without loss of time. A new container with a new jacket is then placed in the mold. Another operator withdraws the finished containers from their respective jackets by means of a special machine, without retarding the operation of the main machine. A plurality of jackets are provided so that some jackets can be loaded while others are being emptied of the completed containers.

Instead of having two separate control valves 30 and 31, these valves can be replaced by a single valve, as illustrated schematically in Fig. 4. A single valve 51 is provided at the junction of lines 29, 29A and 29B, the valves 30 and 31 being omitted and the system being otherwise the same as shown in Fig. 1. When the handle of valve 51 is turned in one direction, fluid pressure is supplied through line 29A to the cylinders of pistons 12 and 27. When the handle is moved in another direction, fluid is supplied through line 29B to the pressure exchanger 17. A discharge or return line 53 relieves the pressure when the handle is moved back to neutral position. It is also possible to eliminate the push-button 37 and to release the fall of the weight 20 automatically by the closure of the contacts of the manometer or pressure-responsive switch 33. In this case, all control of the machine is effected by means of a single handle, namely the handle of the control valve 51.

In order to facilitate the replacement of the protective envelope 10B mentioned above, the check valve 11 is preferably given a form such that it can act as a tool for unscrewing the nut of bolt 7. For example, as illustrated in Fig. 5, which is an end view of the check valve 11, this valve member can be formed to provide a socket wrench cavity 55 adapted to fit the nut on bolt 7 or to fit the head of the bolt in the event a screw stud is used. By moving the valve 11 with its piston 12 to the left and turning it, the nut can be unscrewed, permitting the removal of the core 6 through the open end of mold 1 so as easily and rapidly to replace the protective envelope 10B.

It will be seen that the functioning of the machine in accordance with the invention has several advantageous characteristics. The correct order of the various operations is insured automatically, loss of time being reduced to a minimum and safety being guaranteed by the proper control. The active liquid, such as glycerin, which is used for exerting the useful work, never comes into contact with the free air, which eliminates all possibility of pollution, formation of emulsion, absorption of water, etc. The prior inflating of the elastic envelope is effected by an auxiliary source of moderate pressure, which results in considerable economy in design and in the consumption of energy in the operation of the high pressure system by which final shaping of the container is effected. Another economy results from the fact that the machine recovers a large part of the working energy by the elastic rebound of the weight 20 and piston 19 at very high pressure. Thanks to this rebound, the energy required to raise the weight the remaining distance by the piston 27 is relatively slight.

It will be understood that the foregoing description is given only by way of simplified example and that numerous modifications can be made in the machine without departing from the scope of the invention.

What I claim and desire to secure by letters patent is:

1. In a machine for shaping containers by internal pressure, a mold having a cavity to enclose a container to be shaped, a head for closing said cavity, a core projecting into said cavity and substantially filling the inside of a container in the cavity, an extensible elastic envelope enclosing said core and hydraulic means for preparatorily inflating said envelope comprising means for supplying moderate fluid pressure, means connecting said moderate pressure supply to the interior of said envelope, a check valve in said connecting means to restrain flow of fluid back toward said supply, molding means comprising a high pressure cylinder connected with the interior of said envelope, said cylinder being approximately vertical, a piston reciprocable in said cylinder, a weight releasably held above said piston, means comprising a pressure-responsive switch and a solenoid in series with said switch for releasing said weight when moderate fluid pressure has been applied to said envelope, the rapid descent of said weight, when released, driving the piston downwardly in said cylinder to apply high pressure to said envelope, whereupon inherent elasticity of the fluid pressure system including the walls confining the fluid causes elastic rebound of the weight, a pivotally mounted catching device for retaining the weight on its rebound to a lower level than its starting position and means for raising said weight from the level at which it is caught to its starting position comprising a hydraulic piston connected to said means for supplying moderate pressure, said catching device being adapted to release said weight under the action of said electromagnetic device.

2. A machine according to claim 1, in which said envelope comprises two superposed layers, namely a fluid-tight inner layer and an outer layer that can be readily replaced.

3. A machine according to claim 1, in which said mold and core are formed with cooperating annular shoulders between which edge portions of the extensible envelope are disposed and bolt means is provided for clamping said edge portions of the envelope in fluid-tight relationship between said shoulders.

4. In a machine for shaping containers by internal pressure, a mold having a cavity to receive a container to be shaped, a core projecting into said cavity and into a container in the cavity, an expansible elastic envelope surrounding said core, said core having passageways communicating with the interior of said envelope, means for preliminarily inflating said envelope by moderate fluid pressure, means for facilitating and accelerating the extraction of a finished container from said mold, a combination of means for effecting the shaping of said container by a single shock of high fluid pressure and for a partial recovery of the work energy developed by said means, said combination means comprising a small diameter high pressure vertical cylinder communicatively connected with the interior of said envelope, a piston reciprocable in said cylinder, a weight releasably held above said piston, means for guiding and releasing said weight sequential to the preliminary inflation of said envelope, whereby upon release said weight displaces said piston so as to produce a high pressure and form said container, said weight rebounding to a level somewhat lower than its original starting level, a catching device for catching and retaining said weight upon rebound, and means for raising said weight to a higher level from that at which it is caught, whereby it is positioned in starting position.

5. A machine in accordance with claim 4 in which said means for facilitating and accelerating the extraction of a finished container from said mold comprises a resilient intermediate jacket fitting into said mold with a slight clearance and receiving a container to be shaped, said jacket being able to expand and contract so that it expands into tight contact with said mold when said high pressure is applied and contracts when said pressure is released so that it is easily removable from said mold.

6. A machine, in accordance with claim 1, in which said core is removable.

References Cited in the file of this patent

UNITED STATES PATENTS

| 199,936 | Rowland | Feb. 5, 1878 |
|---|---|---|
| 1,753,680 | Batie | Apr. 8, 1930 |
| 1,930,745 | Fisher | Oct. 17, 1933 |
| 2,375,599 | Walton | May 8, 1945 |
| 2,458,182 | McDonald | Jan. 4, 1949 |
| 2,482,280 | Lerma | Sept. 20, 1949 |
| 2,615,411 | Clevenger | Oct. 28, 1952 |